United States Patent [19]

Chen

[11] Patent Number: 5,092,569
[45] Date of Patent: Mar. 3, 1992

[54] WORKPIECE HOLDING DEVICE FOR A MACHINING EQUIPMENT

[76] Inventor: Yen-Huang Chen, No. 97-1, Chung-Ching Rd., Taichung City, Taiwan

[21] Appl. No.: 761,493

[22] Filed: Sep. 18, 1991

[51] Int. Cl.⁵ .............................................. B23Q 3/06
[52] U.S. Cl. ...................................... 269/63; 269/75; 269/287; 269/254 CS; 269/111; 269/88
[58] Field of Search ............. 269/63, 75, 287, 254 CS, 269/111, 88, 900; 408/89; 409/219, 221, 224, 164, 174

[56] References Cited

U.S. PATENT DOCUMENTS

| | | | |
|---|---|---|---|
| 3,106,111 | 10/1963 | Denisco | 269/287 |
| 3,822,959 | 7/1974 | Tobard | 408/89 |
| 4,373,980 | 2/1983 | Skolmieski et al. | 269/287 |
| 4,585,217 | 4/1986 | Erickson | 269/900 |
| 4,828,240 | 5/1989 | Longenecker et al. | 269/900 |
| 5,052,092 | 10/1991 | Vallauri et al. | 269/287 |

Primary Examiner—Robert C. Watson
Attorney, Agent, or Firm—Banner, Birch, McKie & Beckett

[57] ABSTRACT

A workpiece holding device is used to retain a workpiece that is to be provided on a rotatable workbench of a machining equipment and includes a clamping assembly that is formed as a hollow sphere having six inner sides which confine a cubic receiving space. The hollow sphere is divided into a plurality of curved pieces by cutting the hollow sphere along six cutting planes which are coplanar with the six inner sides. Each of the six inner sides is provided with a plurality of clamping pins which are biased so as to extend into the cubic receiving space and contact the workpiece. A clamping seat assembly is to be provided on top of the rotatable workbench and confines an accessible spherical receiving space. The clamping assembly is rotatably provided in the spherical receiving space. The curved pieces are selectively assembled and disassembled so as to expose the side of the workpiece that is to be machined.

5 Claims, 6 Drawing Sheets

WORKPIECE HOLDING DEVICE FOR A MACHINING EQUIPMENT

BACKGROUND OF THE INVENTION

1. Field of the Invention

The invention relates to a machining equipment, and more particularly to a workpiece holding device for a machining equipment in order to facilitate the high-precision machining of a six-sided workpiece.

2. Description of the Related Art

FIG. 1 shows a conventional machining equipment to mainly comprise a machine frame 10, a movable shaft assembly 11 and a workbench 13. The movable shaft assembly 11 is provided on one side of the machine frame 10. A clamping member 111 is provided on one end of the shaft assembly 11. A cutting tool 14 is attached to the shaft assembly 11 via the clamping member 111. A workpiece (not shown) is to be secured on top of the workbench 13. A power means (not shown) rotatably drives the shaft assembly 11 to move the cutting tool 14 in a direct line of motion relative to the workpiece. The workbench 13 is then rotated so as to align one side of the workpiece with the line of motion of the cutting tool 14. However, even if the workbench 13 has been rotated for 360 degrees, only four of the six sides of a rectangular workpiece can be machined without moving the workpiece relative to the workbench 13.

Although present computer numeric controlled (CNC) machining equipments can also machine the top side (fifth side) of a rectangular workpiece, the sixth side of the workpiece which is in contact with the workbench cannot be machined without adjusting the position of the workpiece on the workbench.

When moving the workpiece relative to the workbench, utmost care must be taken so that the side to be machined is aligned with the line of motion of the cutting tool so as to maintain the same depth of machining. It is thus possible that the machining precision will be affected whenever the position of the workpiece is adjusted.

Recent numeric controlled (NC) machining equipments can perform different machining operations on the same workpiece upon the keying-in of a string of instructions. Thus, the position of the workpiece on the workbench is further adjusted so that the desired machining operation can be conducted on the selected part of the workpiece. Therefore, the machining precision and the succeeding machining operations will be affected if the workpiece is improperly placed on the workbench when the sixth side of the workpiece is machined.

SUMMARY OF THE INVENTION

Therefore, the main objective of the present invention is to provide a workpiece holding device for a machining equipment in order to facilitate the high-precision machining of a six-sided workpiece.

Accordingly, the preferred embodiment of a workpiece holding device is used to retain a workpiece that is to be provided on a rotatable workbench of a machining equipment, and comprises: a clamping assembly being formed as a hollow sphere having six inner sides which confine a cubic receiving space, said hollow sphere being divided into a plurality of curved pieces by cutting the same along six cutting planes which are coplanar with the six inner sides; a retaining means provided on the six inner sides so as to hold the workpiece in the cubic receiving space; and a clamping seat assembly to be provided on top of the rotatable workbench and being formed as a hollow cube that confines a spherical receiving space which corresponds to the shape of the clamping assembly so as to properly and rotatably receive the clamping assembly. The hollow cube is divided into a plurality of blocks by cutting the hollow cube along six cutting planes which are coplanar with the six inner sides. The curved pieces and the blocks are selectively assembled and disassembled so as to expose the side of the workpiece that is to be machined.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
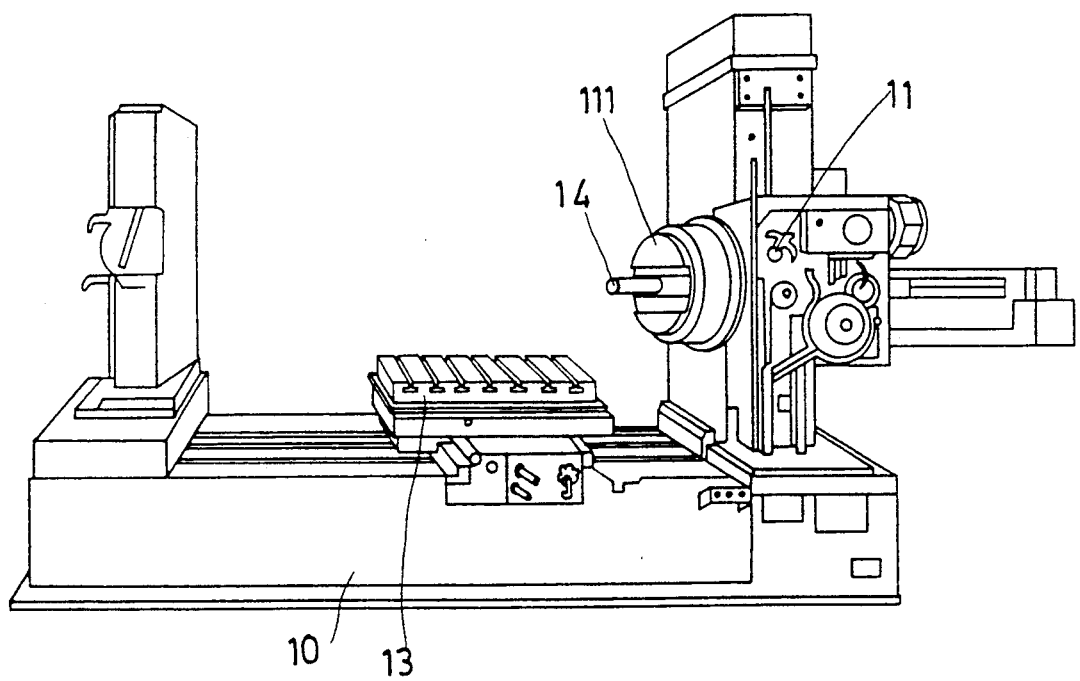
FIG. 1 is an illustration of a conventional machining equivalent.
Figure 2:
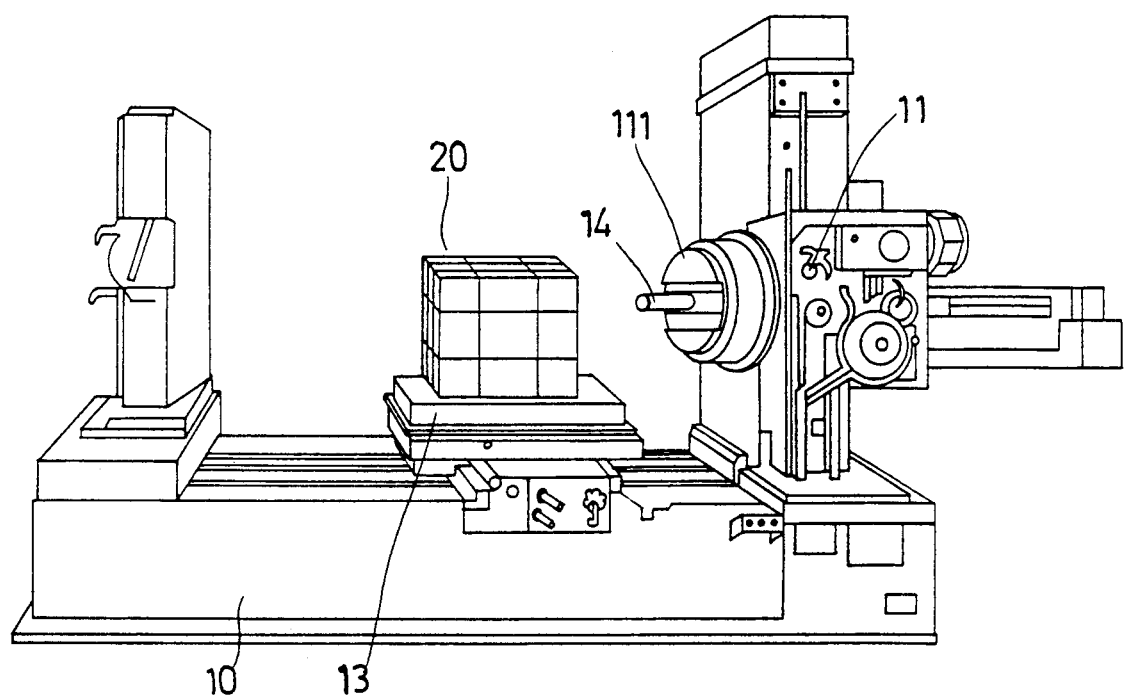
FIG. 2 is an illustration of the preferred embodiment of a workpiece holding device when used with a machining equipment.

Referring to FIG. 2, the preferred embodiment of a workpiece holding device 20 according to the present invention is to be provided on top of a rotatable workbench 13 of a machining equipment. (The machining equipment shown in FIG. 2 is substantially similar to that shown in FIG. 1 and will not be detailed further).

Figure 3:
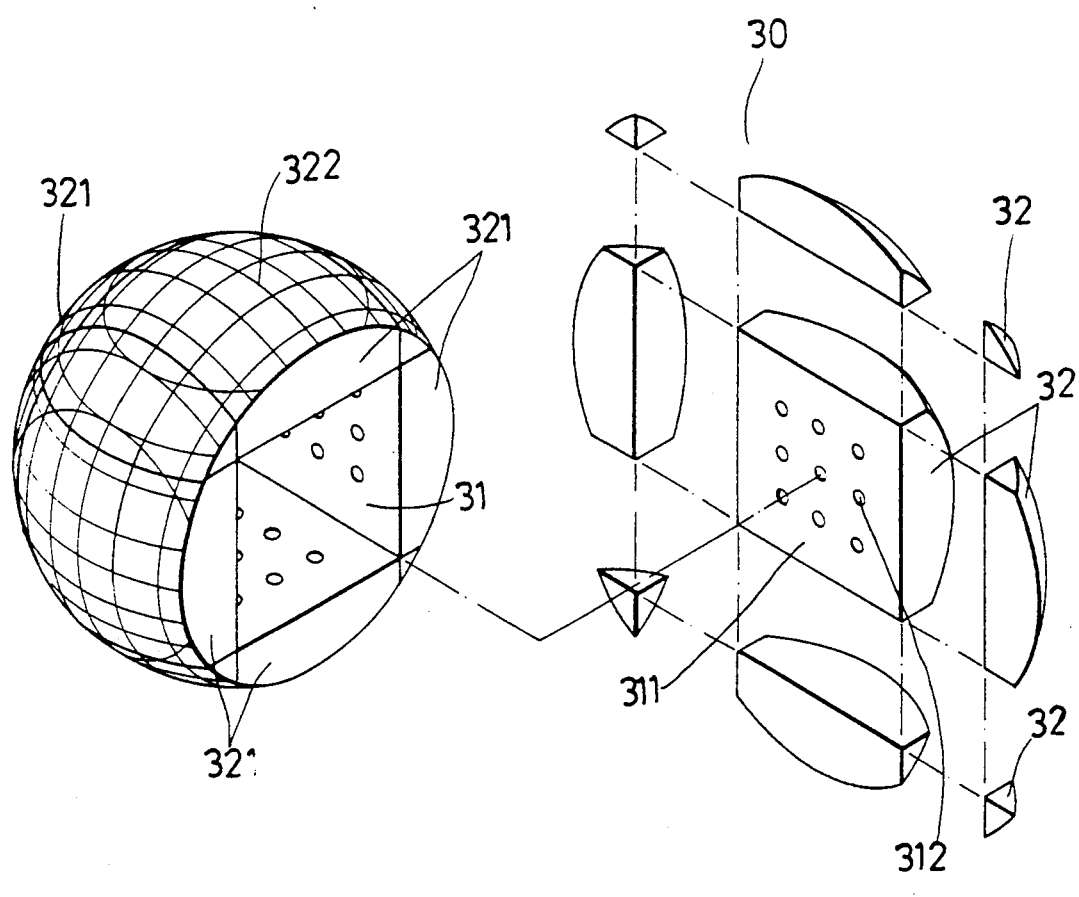
FIG. 3 is a partially exploded view of a clamping assembly of the workpiece holding device of the present invention.
Figure 4:
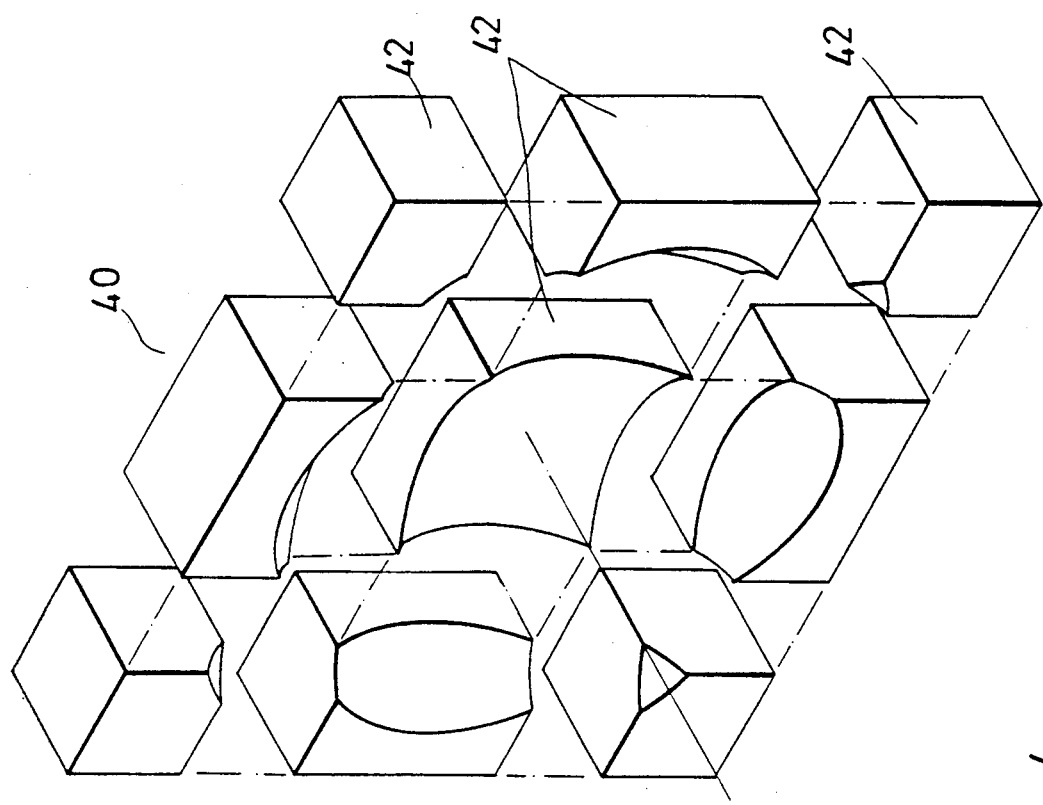
FIG. 4 is a partially exploded view of a clamping seat assembly of the preferred embodiment.
Figure 4:
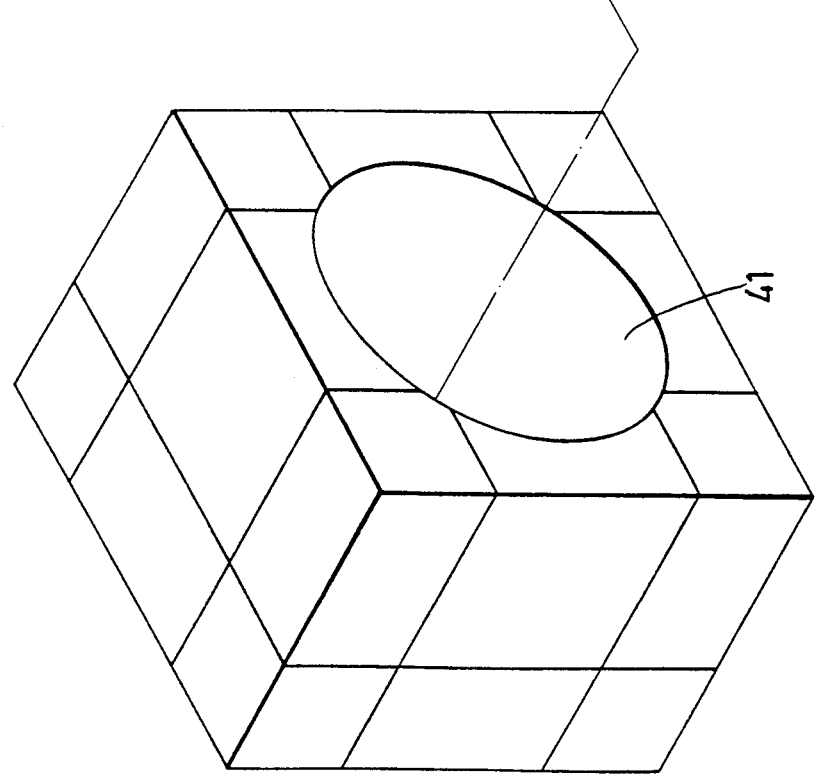

Referring to FIGS. 3 and 4, the workpiece holding device 20 comprises a clamping assembly 30 and a clamping seat assembly 40.

Figure 7:
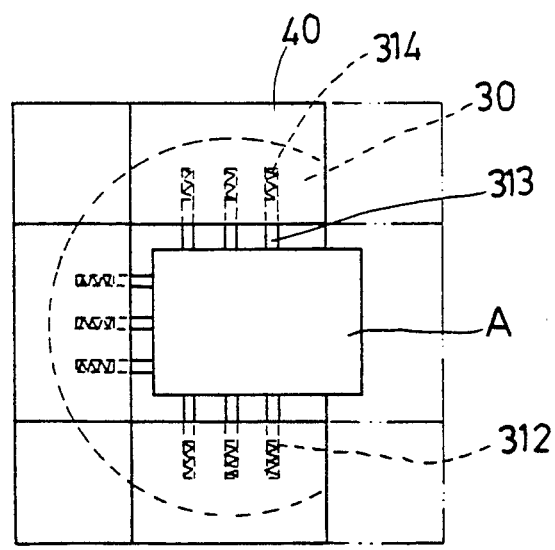
FIG. 7 is a side view of the preferred embodiment when retaining a workpiece.

The clamping assembly 30 is formed as a hollow sphere having six inner sides 311 which confine a cubic receiving space 31. The clamping assembly 30 is divided into twenty-six curved pieces 32 formed by cutting the hollow sphere along six cutting planes which are coplanar with the six inner sides thereof. Each of the inner sides 311 is formed with a plurality of blind bores 312. Each of the blind bores 312 receives a clamping pin 313 being biased by a corresponding spring 314 so as to extend into the receiving space 31 (Refer to FIG. 7). The workpiece is received in the receiving space 31 and is retained therein by the clamping pins 313. The curved pieces 32 form six convex sides 321 on the outer surface of the hollow sphere. Each of the convex sides 321 is aligned with one of the inner sides 311 and has an outer surface provided with concentric guide marks 322.

Figure 5:
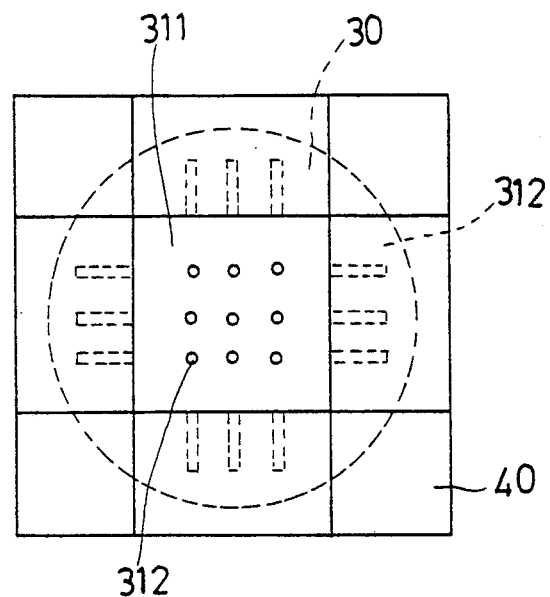
FIG. 5 is a fragmentary front view of the preferred embodiment.

The clamping seat assembly 40 is formed as a hollow cube which confines a spherical receiving space 41 that corresponds to the shape of the clamping assembly 30 so as to properly receive the same (Refer to FIG. 5). The clamping seat assembly 40 is to be provided on top of the rotatable workbench of the machining equipment and is divided into a plurality of blocks 42 by cutting the hollow cube along six cutting planes which are also coplanar with the six inner sides 311. The blocks 42 enclose the clamping seat 30 and help retain the shape of the clamping seat 30.

Figure 6:
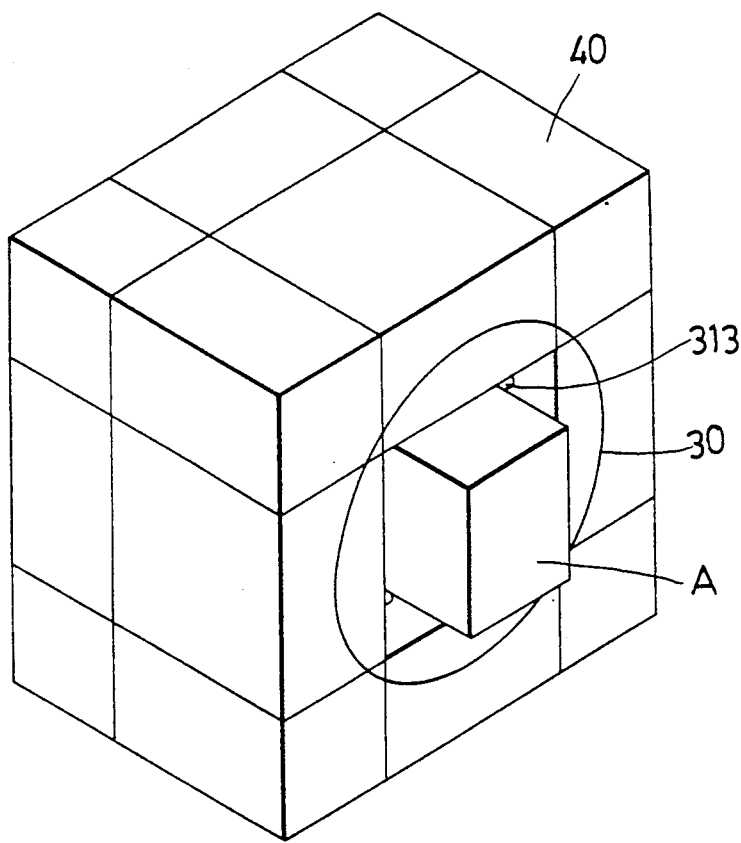
FIG. 6 is a perspective view of the preferred embodiment when retaining a workpiece.

FIG. 6 is an illustration of the preferred embodiment when retaining a workpiece (A). The clamping assembly 30 is rotatably provided in the receiving space 41. The blocks 42 and the curved pieces 32 are selectively assembled and disassembled so as to expose the side of the workpiece (A) that is to be machined. The workbench is rotated in order to machine four of the six sides of the workpiece (A). The clamping seat 30 is then rotated relative to the clamping seat assembly 40 so as to permit the machining of the two other sides of the workpiece (A). High machining precision can thus be obtained since the position of the workpiece relative to the workbench remains unchanged.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A workpiece holding device for retaining a workpiece that is to be provided on a rotatable workbench of a machining equipment, said workpiece holding device comprising:

a clamping assembly being formed as a hollow sphere having six inner sides which confine a cubic first receiving space, said hollow sphere being divided into a plurality of curved pieces by cutting said hollow sphere along six cutting planes which are coplanar with said six inner sides;

a retaining means provided on said six inner sides so as to hold the workpiece in said cubic first receiving space; and a clamping seat assembly to be provided on top of the rotatable workbench and confining an accessible second receiving space, said clamping assembly being rotatably provided in said second receiving space, said curved pieces being selectively assembled and disassembled so as to expose one side of the workpiece that is to be machined.

2. The workpiece holding device as claimed in claim 1, wherein:

each of said inner sides is formed with a plurality of blind bores; and said retaining means comprises a plurality of springs each being received in one of said blind bores, and a plurality of clamping pins each being biased by a corresponding one of said springs so as to extend into said cubic first receiving space and contact the workpiece.

3. The workpiece holding device as claimed in claim 1, wherein said curved pieces form six convex sides on an outer surface of said hollow sphere, each of said convex sides being aligned with one of said inner sides, each of said convex sides being provided with concentric guide marks so as to facilitate the positioning of said clamping assembly in said second receiving space.

4. The workpiece holding device as claimed in claim 1, wherein said clamping seat assembly is formed as a hollow cube that confines said second receiving space, said second receiving space being spherical in shape and corresponding to the shape of said clamping assembly so as to properly receive said clamping assembly.

5. The workpiece holding device as claimed in claim 4, wherein said hollow cube is divided into a plurality of blocks by cutting said hollow cube along six cutting planes which are coplanar with said six inner sides.

* * * * *